US010846787B2

(12) United States Patent
Semret

(10) Patent No.: US 10,846,787 B2
(45) Date of Patent: *Nov. 24, 2020

(54) REPLACEMENT OF CONTENT ITEMS

(71) Applicant: Google LLC, Mountain View, CA (US)

(72) Inventor: Nemo Semret, New York, NY (US)

(73) Assignee: Google LLC, Mountain View, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 15/935,427

(22) Filed: Mar. 26, 2018

(65) Prior Publication Data

US 2018/0211311 A1 Jul. 26, 2018

Related U.S. Application Data

(63) Continuation of application No. 13/835,152, filed on Mar. 15, 2013, now Pat. No. 9,959,570.

(51) Int. Cl.
G06Q 30/06 (2012.01)
G06Q 30/00 (2012.01)
G06Q 30/02 (2012.01)
G06Q 30/08 (2012.01)

(52) U.S. Cl.
CPC ............ *G06Q 30/08* (2013.01); *G06Q 30/06* (2013.01); *G06Q 30/00* (2013.01); *G06Q 30/02* (2013.01)

(58) Field of Classification Search
CPC .................. G06Q 30/00; G06Q 30/02; G06Q 30/06–0645; G06Q 30/08; G06Q 50/01
See application file for complete search history.

(56) References Cited

U.S. PATENT DOCUMENTS

| 7,346,545 B2* | 3/2008 | Jones | G06Q 30/02 705/14.73 |
| 2002/0184093 A1 | 12/2002 | Cherry et al. | |
| 2004/0168121 A1* | 8/2004 | Matz | H04L 63/10 715/255 |
| 2007/0204223 A1* | 8/2007 | Bartels | H04N 21/2543 715/210 |
| 2007/0260514 A1 | 11/2007 | Burdick et al. | |
| 2008/0155589 A1 | 6/2008 | McKinnon et al. | |

(Continued)

OTHER PUBLICATIONS

Gupta, "Method and System for Exchanging Content," IP.com Prior Art Database Technical Disclosure, Defensive Publication, Aug. 31, 2011, 3 pages. (Year: 2011).*

(Continued)

*Primary Examiner* — Adam L Levine
(74) *Attorney, Agent, or Firm* — Fish & Richardson P.C.

(57) ABSTRACT

Example systems may include: receiving an auction announcement message for a content inventory unit from an auction platform, where the auction announcement message includes an identifier that is associated with a user device; determining a bid for the content inventory unit based on data in a record associated with the identifier; transmitting the bid to the auction platform in response to the auction announcement message; transmitting a content item associated with the identifier in response to the auction announcement message; receiving a message indicating that the content item is presented on the user device; and updating a stored account value associated with the identifier based on an auction price for the content inventory unit.

20 Claims, 5 Drawing Sheets

(56) References Cited

U.S. PATENT DOCUMENTS

| | | | |
|---|---|---|---|
| 2010/0145809 A1* | 6/2010 | Knapp | G06Q 30/02 |
| | | | 705/14.71 |
| 2010/0228597 A1 | 9/2010 | Das et al. | |
| 2012/0059717 A1 | 3/2012 | Furman et al. | |
| 2013/0030987 A1 | 1/2013 | Zuckerberg et al. | |
| 2013/0031579 A1* | 1/2013 | Klappert | H04N 21/454 |
| | | | 725/32 |

OTHER PUBLICATIONS

International Search Report and Written Opinion in International Application No. PCT/US2014/020709, dated Jun. 20, 2014, 11 pages.

Gupta, "Method and System for Exchanging Content," IP.com Prior Art Database Technical Disclosure, Defensive Publication, Aug. 31, 2011, 3 pages.

* cited by examiner

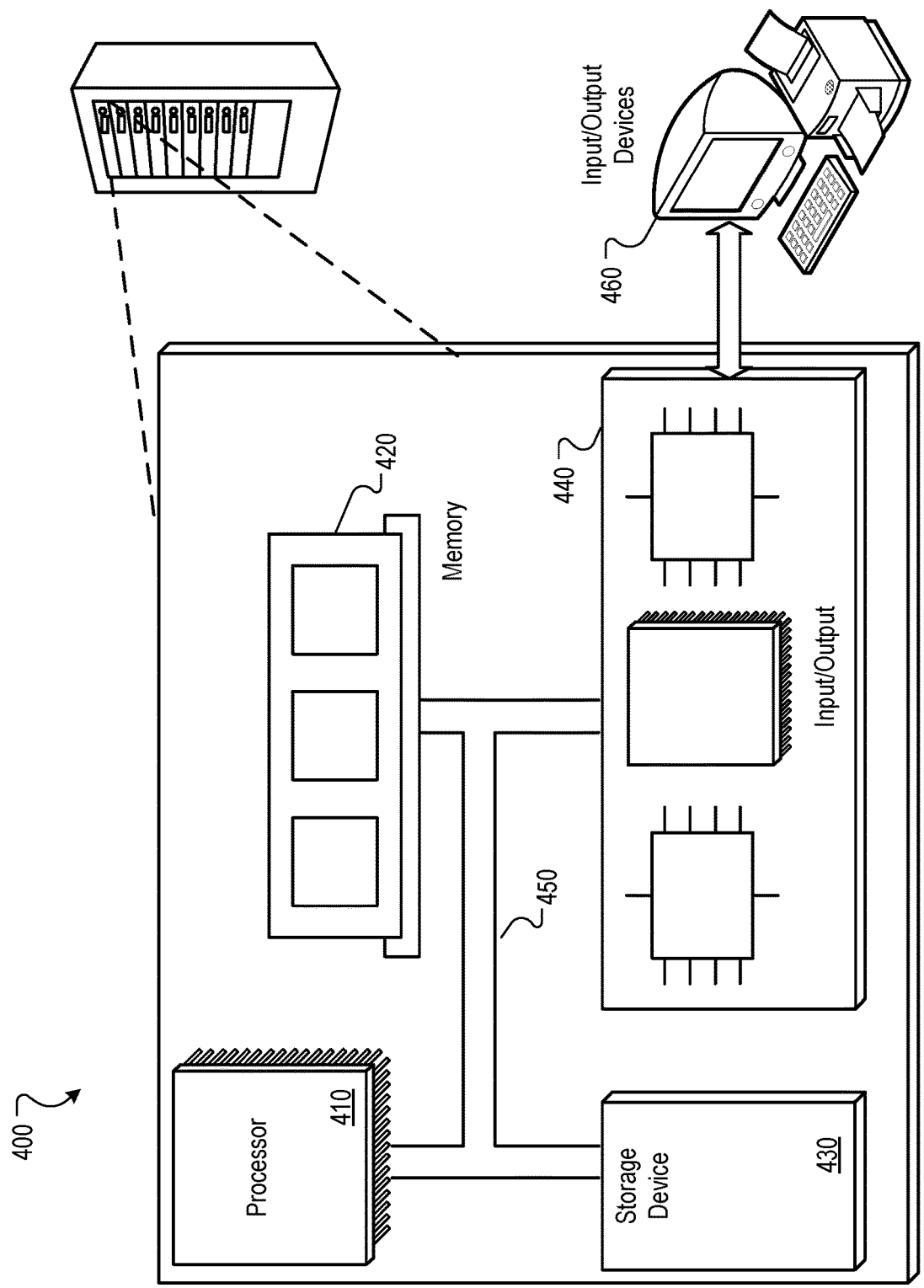

REPLACEMENT OF CONTENT ITEMS

CROSS-REFERENCE TO RELATED APPLICATIONS

This application is a continuation application of, and claims priority to, U.S. patent application Ser. No. 13/835,152, titled "REPLACEMENT OF CONTENT ITEMS," filed on Mar. 15, 2013. The disclosure of the foregoing application is incorporated herein by reference in its entirety for all purposes.

BACKGROUND

This disclosure relates to the selection and delivery of online content.

Online content can include web pages and advertisements displayed with the web pages. Content publishers have space that they sell to advertisers or other content providers directly or through intermediaries. Some of a publisher's available space may be sold through a content inventory marketplace. This content inventory market may be a spot market that connects publishers with content providers (e.g., advertisers) in response to a request for content from a user. The publisher may communicate with one or more content providers or market intermediaries in an attempt to sell the space.

SUMMARY

Example systems for suppressing content items may include: receiving an auction announcement message for a content inventory unit from an auction platform, where the auction announcement message includes an identifier that is associated with a user device; determining a bid for the content inventory unit based on data in a record associated with the identifier; transmitting the bid to the auction platform in response to the auction announcement message; transmitting a content item associated with the identifier in response to the auction announcement message; receiving a message indicating that the content item is presented on the user device; and updating a stored account value associated with the identifier based on an auction price for the content inventory unit. The example systems may include one or more of the following features, either alone or in combination.

The example systems may include, before receiving the auction announcement message, receiving, from the user device, data specifying the content item. The content item may be empty and cause a blank image or video of zero duration to be presented in a content slot in a display of the user device.

The example systems may include, before receiving the auction announcement message, receiving, from the user device, data specifying the bid. The data specifying the bid may include a list of publishers. The data specifying the bid may indicate a fixed bid. The data specifying the bid may indicate a budget for a period of time and historical online traffic data for the user device.

The example systems may include: receiving a payment initiating message from the user device; and updating the stored account value associated with the identifier based in part on the payment initiating message.

The example systems may include transmitting a request to the auction platform to receive auction announcement messages for content inventory units associated with data comprising the identifier. The data for the identifier may be for a cookie.

Transmitting the content item may include transmitting the content item to the auction platform. Transmitting the content item may include transmitting the content item to the user device.

The content inventory unit may be sold by a first publisher. The example systems may include: receiving a second auction announcement message for a second content inventory unit from the auction platform, where the second auction announcement message includes the identifier; determining a second bid for the second content inventory unit based on data in the record associated with the identifier, where the second content inventory unit is sold by a second publisher; transmitting the second bid to the auction platform in response to the second auction announcement message; transmitting the content item associated with the identifier in response to the second auction announcement message; receiving a second message indicating that the content item is presented on the user device; and updating the stored account value associated with the identifier based on the second bid.

The example systems may include transmitting a usage report to the user device reflecting allocations of content inventory units to the content item and corresponding changes in the stored account value associated with the identifier.

The example systems may include, before receiving the auction announcement message, transmitting the identifier to the user device.

Particular embodiments of the subject matter described in this disclosure can be implemented to realize none, one or more of the following advantages. Users may be enabled to pay to view online resources (e.g., webpages) with fewer advertisements to enhance the user's viewing experience. Users may be enabled to pay many different publishers for each online resource viewed by the user with low transaction costs. Users may be enabled to support favored publishers with many small payments occurring during use of the publisher's online resources, without requiring a registration of the user with the publisher. Market-based pricing of the content replacement may be achieved by having content replacement occur in competition with advertising, using auctions on ad exchanges.

Two or more of the features described in this disclosure/specification, including this summary section, can be combined to form implementations not specifically described herein.

The systems and techniques described herein, or portions thereof, can be implemented as a computer program product that includes instructions that are stored on one or more non-transitory machine-readable storage media, and that are executable on one or more processing devices. The systems and techniques described herein, or portions thereof, can be implemented as an apparatus, method, or electronic system that can include one or more processing devices and memory to store executable instructions to implement the stated operations.

The details of one or more implementations are set forth in the accompanying drawings and the description below. Other features, objects, and advantages will be apparent from the description and drawings, and from the claims.

BRIEF DESCRIPTION OF THE DRAWINGS

FIG. 4 is block diagram of an example computer system that can be used to facilitate the selection and delivery of content.

DETAILED DESCRIPTION

Figure 1:
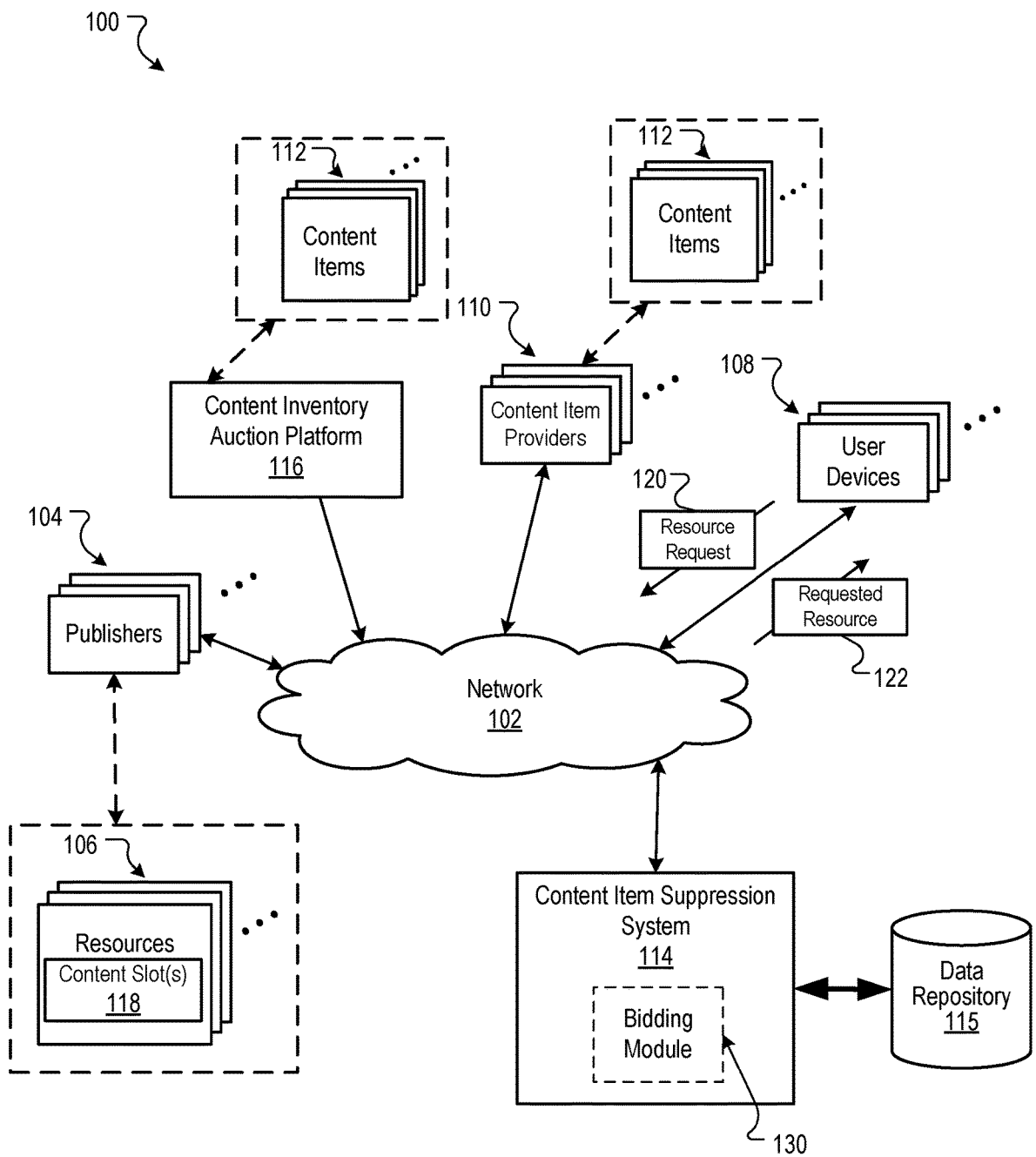
FIG. 1 is a block diagram of an example online environment.

A content item is any data that can be provided over a network. For example, an advertisement, including a link to a landing page is a content item. The processes described below are illustratively applied to content items that are advertisements provided in response to a request from an online resource, but the processes are also applicable to other content items provided over a network.

A content inventory unit is a unit of content space inventory (e.g., a space for an advertisement, also known as an ad slot, paired with an online resource such as a web page or web video stream). For example, a content inventory unit may occur when an advertisement is delivered, usually with an accompanying online resource, to a user. A content inventory unit may have a number of characteristics, such as characteristics of the requested resource to be paired with the secondary content (e.g., an advertisement or other content item), parameters (e.g., dimensions or format) of a content slot in which the secondary content will be presented, the timing of the user request and corresponding delivery of content, and characteristics of the user who requested the content, such as demographic information and geographic location. A single user request for content may initiate multiple content inventory units. For example, a user request for a web page may allow a publisher to deliver multiple advertisements that are displayed in different locations within the rendered web page. In some implementations, a system can record an indication of each delivered content inventory unit, such as for accounting purposes.

Online content publishers try to derive as much revenue as they can from their available inventory (e.g., content inventory units in which advertisements or other content items may be presented). Publishers may sell some of their inventory through an auction platform. An auction platform can allocate a content inventory unit by accepting bids from one or more potential buyers (e.g., advertisers, advertising networks, or other demand-side platforms), selecting a winning bid, and determining a buyer's price for the content inventory unit based on a set of rules called an auction mechanism. In some implementations, the auction mechanism may be designed to be truthful, in the sense that it incentivizes potential buyers to bid their true valuation of the content inventory unit. For example, a second-price auction may create an incentive for a potential buyer to bid their true valuation of a content inventory unit. When a content inventory unit is allocated to a winner of one of these auctions, the winning buyer pays a price determined by the auction mechanism.

A reserve price may be declared by a seller (e.g., a publisher) when submitting a request for allocation of a content inventory unit through an auction platform. The reserve price declared by the seller may be the minimum amount of revenue that the seller will accept in return for the allocation of the content inventory unit. If no bid exceeds the reserve price, then the content inventory unit may not be allocated through the auction platform (or equivalently, the content inventory unit is allocated back to the seller).

A user may wish to avoid being presented with third party content items (e.g., advertisements) while viewing online resources. In some implementations, a system allows a user to bid in a spot market to suppress third party content items, or replace third party content items with content inventory units that will be presented to the user in place of the third party content items. If the user's bid is the highest bid, then a user specified content item (e.g., a blank content item, a thank you message, or another custom text, image, or video of the user's choosing) is presented to the user instead of a third party content item. A centralized system may utilize existing content inventory allocation infrastructure (e.g., a content inventory auction platform, a content inventory exchange, an ad exchange) to interface to a large number of different publishers that use this infrastructure to manage their content inventory. Small payments to multiple publishers can be facilitated without registering the user with each such publisher, thus reducing transaction costs associated with a user paying directly for consumed online resources.

For example, a user may create an account with a centralized content item suppression system and pre-pay for a certain amount of credit, e.g., using a credit card or other online payment method. The user may specify rules for bidding on the content inventory units that will be presented to the user. For example, the user may specify a fixed cost-per-mille that the user is willing to pay to suppress third party content items and that fixed rate may be used as the bid for all such content inventory units. In some implementations, the bid may depend on the media type of the content inventory unit (e.g., one bid for image content inventory units and a higher bid for video content inventory units) or other factors. The user may also specify one or more content items that the user wants presented in lieu of third party content items. For example, the user may specify blank or null content items (e.g., an image with pixels all the same color, or a video clip of duration zero). In another example, a snippet of HTML code may display customized text and images for the user in the content items, and the user may specify one or more default texts and images the user wants presented in lieu of the customized items.

The content item suppression system may issue an account identifier to the user's device(s). The account identifier may be incorporated in data presented to publishers and the content inventory management infrastructure as part of a normal online content request and allocation process. For example, the account identifier may be included in a cookie stored on a user device. The system may also provide the account identifier to one or more content inventory exchanges, so that the auction platforms are configured to alert the system when a content inventory unit is to be presented to the user (e.g., by putting a cookie on a list known as a remarketing list).

When the user accesses or visits a publisher's online resource (e.g., webpages or video) with one or more content slots available for the presentation of content items, the publisher's system and/or the user's device make a standard request for allocation of each resulting content inventory unit. The request is passed to a content inventory exchange. The request may include the account identifier for the user in a cookie. Upon receiving the request for allocation, the content inventory exchange may match the request to its configured list of account identifiers and identify the centralized server that configured it with the account identifier as interested in bidding on the content inventory unit. An auction announcement message may be sent to the centralized server or a bidding server, which may respond by submitting a bid in compliance with bidding rules specified by the user associated with the account identifier. In some examples, the servers can provide at least two service components. For example, one or more servers can act as "front-end" servers, e.g., to provides a user interface on a site where the users can enroll, log in, fill their accounts, and/or perform other appropriate actions, and one or more servers can act as "bidder" servers, e.g., to receive requests for bids and respond. In some examples, the servers can be geographically distributed. If the bid determined by the centralized server is the highest bid for the content inventory unit, then a content item specified by the user is transmitted directly or indirectly to the user device for presentation to the user in the applicable content slot of the requested online resource. When the centralized server receives notification that the bid was accepted and/or the user specified content item was presented, the credit associated with content item suppression account may be decreased by the amount of the auction price. The publisher need not augment its servers or have an established relationship with the user.

For example, a user may configure the centralized server to bid on content inventory units that will be presented to the user and seek to insert a blank image in place of third party advertisements. When the user's bid (submitted by the centralized server) wins an auction, the user sees a webpage they requested with a blank image (e.g., a featureless monochrome image) inserted in a content slot of the webpage, instead of a third party advertisement. Alternatively, the user can configure the centralized server to attempt to insert any format compliant content item (e.g., a personalized widget) of the user's choice in content slots of webpages that the user accesses. In this manner, third party content items (e.g., advertisements) may be suppressed in the user's online viewing experience.

FIG. 1 is an illustration of an example environment 100 in which content is provided to a user. The example environment 100 includes a network 102, such as a local area network (LAN), a wide area network (WAN), the Internet, or a combination thereof. The example environment 100 also includes publishers 104 that host (directly or indirectly) resources 106, user devices 108, content item providers 110 hat host (directly or indirectly) content items 112, a content item suppression system 114, and a content inventory exchange 116. While the content item suppression system 114 and content inventory exchange 116 are depicted separately, they may be realized as part of a single system.

A resource 106 is data provided over the network 102. A resource 106 is identified by a resource address that is associated with the resource 106. Resources 106 include HTML pages, word processing documents, portable document format (PDF) documents, images, video, and feed sources, to name only a few. The resources 106 can include content, such as words, phrases, images and sounds, that may include embedded information (such as meta-information in hyperlinks) and/or embedded instructions (such as scripts). Resources 106 may also include one or more content slots 118, which are portions of a resource 106 in which advertisements or other content items 112 are inserted for presentation to a user.

Resources are generally hosted by publishers 104 either directly (e.g., on a server computer owned by the publisher) or indirectly (e.g., on a server computer owned by a third party but paid for by the publisher). A publisher 104 is an entity that hosts and/or provides electronic access to a resource (e.g., web page content) by use of the network 102.

Publishers 104 may generate revenue by selling content item space (e.g., content slots 118) to content item providers 110.

Content item providers 110 are entities, such as advertisers (and may also be publishers), that provide content items 112, such as advertisements, for display with resources 106 and provide compensation to the publisher of resources for the use of the content item space. The content items 112 may be any type of data, and can include, for example, informational, education, or entertainment content, as well as advertisements in the form of graphical advertisements, such as banner advertisements, text only advertisements, image advertisements, audio advertisements, video advertisements, advertisement gadgets with or without interactive features, advertisements combining one of more of any of such components, etc., or any other type of electronic advertisement or content item document. The content items 112 may also include embedded information, such as a links, meta-information, and/or machine executable instructions, such as HTML or JavaScript™. While reference is made herein to the delivery of ads, other forms of content items including other forms of sponsored content items can be delivered by the systems and methods described.

A user device 108 is an electronic device that is under control of a user and is capable of requesting and receiving resources 106 over the network 102. Example user devices 108 include a web-enabled handheld device, a mobile telephone or smartphone, tablet device, a set top box, a game console, a personal digital assistant, a navigation device, a computer, and other devices that can send and receive data over the network 102. A user device 108 typically includes a user application, such as a web browser, to facilitate the sending and receiving of data over the network 102.

The content item suppression system 114 may include one or more data processing apparatus, is capable of communicating across the network 102, and may be coupled to a data repository 115. The content item suppression system 114 provides user specified content items for display with resources 106 in lieu of third party content items 112. The content item suppression system 114 may interface with user devices 108 to allow users to configure accounts with user specified content items and bidding rules. A user device 108 may in turn be provided with a suppression account identifier that may be stored by the user device (e.g., in cookie data). A user interface of the content item suppression system 114 may also allow a user to add credit to the account through an online payment method (e.g., using a credit card).

The content item suppression system 114 may also interface to a content inventory exchange 116 that conducts auctions for content inventory units occurring in available content slots 118. Content item providers 110 may be permitted to select, or bid, an amount the content item providers 110 are willing to pay for each content inventory unit, e.g., a cost-per-mille amount an advertiser pays for presentation of an advertisement (a cost per-thousand content inventory units) or an amount that the content item provider pays when, for example, a user clicks on an advertisement (a cost-per-click). The cost-per-click can include a maximum cost-per-click, e.g., the maximum amount an advertiser is willing to pay for each click of an advertisement based on a keyword that is used to select the advertisement. For example, advertisers A, B, and C all select, or bid, a maximum cost-per-click of $0.50, $0.75, and $1.00, respectively. The content inventory exchange 116 can select the advertisement provided by the highest bidding advertiser and provide that advertisement for display in the content slot 118 of the auctioned content inventory unit. In some implementations, the highest bidding advertiser may be selected after the bid is adjusted for the likelihood of a click, e.g., ranking bids by expected revenue.

The content item suppression system 114 may provide the account identifier associated with a user device 108 to the content inventory exchange 116 in order to configure the content inventory exchange 116 to alert the content item suppression system 114 whenever a content inventory unit is to be presented on the user device 108. For example, the content inventory exchange 116 may alert the content item suppression system 114 by sending an auction announcement message that may include the account identifier.

When a user device 108 submits a resource request 120 to a publisher 104, the publisher 104 causes the requested resource 122 to be provided to the user device 108 in response to the request 120. The requested resource 122 content can include executable instructions that can be executed at the user device 108 to request content items from the content inventory exchange 116. The request may include a content item suppression account identifier (e.g., in cookie data). When the content inventory exchange 116 receives a request for allocation of a content inventory unit, it may allocate a content inventory unit to a content item chosen using an auction mechanism applied to received bids for the content inventory unit. The content inventory exchange 116 may solicit multiple bids from content item providers 110 and from the content suppression system 114 by sending auction announcement message(s) for the content inventory unit. The auction announcement message sent to the content item suppression system 114 may include the account identifier. The amount to be paid by the buyer who placed the winning bid may be determined based on the received bids. For example, the price paid may be equal to the maximum of the second highest received bid and a reserve price for the content inventory unit. In some implementations, the auction may include bids of different kinds, e.g., pay-per-click or pay-per-impression ads suitably converted to statistically equivalent bids to compete against each other.

The content item suppression system 114 may include a bidding module 130 that responds to the auction announcement message. Upon receiving the auction announcement message including the account identifier, the bidding module 130 may access a record associated with the account identifier that is stored in data repository 115. For example, data repository 115 may be a locally connected storage device (e.g., a hard drive) database server or other cloud based storage device accessed through a network. The record for the account may include bidding rules and content items that have been specified by the user. The bidding module 130 then processes data from the record for the account to determine a bid for the content inventory unit and select a user specified content item for presentation in the content slot. This bid and/or the user specified content item are transmitted to content inventory exchange 116 in response to the auction announcement message.

If the bid determined by the bidding module 130 is the highest bid received by the content inventory exchange 116, then the user specified content item is transmitted to the user device 108 for presentation to the user in the content slot. The user specified content item be transmitted directly (through network 102) from the content item suppression system 114 to the user device 108 or indirectly by being relayed by the content inventory exchange 116 and/or the publisher 104. In some implementations, the publisher may receive payment from the content inventory exchange 116.

A confirmation message may be sent to the content item suppression system from the content inventory exchange 116 and/or the user device 108 when the user specified content item is presented on the user device in the content inventory unit. The bidding module 130 may store a record of the transaction in data repository 115, which may later be used to generate suppression account usage reports for the user periodically or upon demand.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

The bidding module 130 may be implemented in a variety of hardware and software configurations. For example, it may be implemented in software running on a dedicated processing system that is connected to a network, such as the Internet. The bidding module 130 may also be implemented in software that runs on a processing system utilized for other functionality, such as content management system or a publisher's webserver. In some implementations, a bidding module 130 may run on a single processing device, such as the processing described below with reference to FIG. 4. In some implementations, a bidding module 130 may run on multiple processing devices that communicate over a network and form a distributed computing system.

Figure 2:
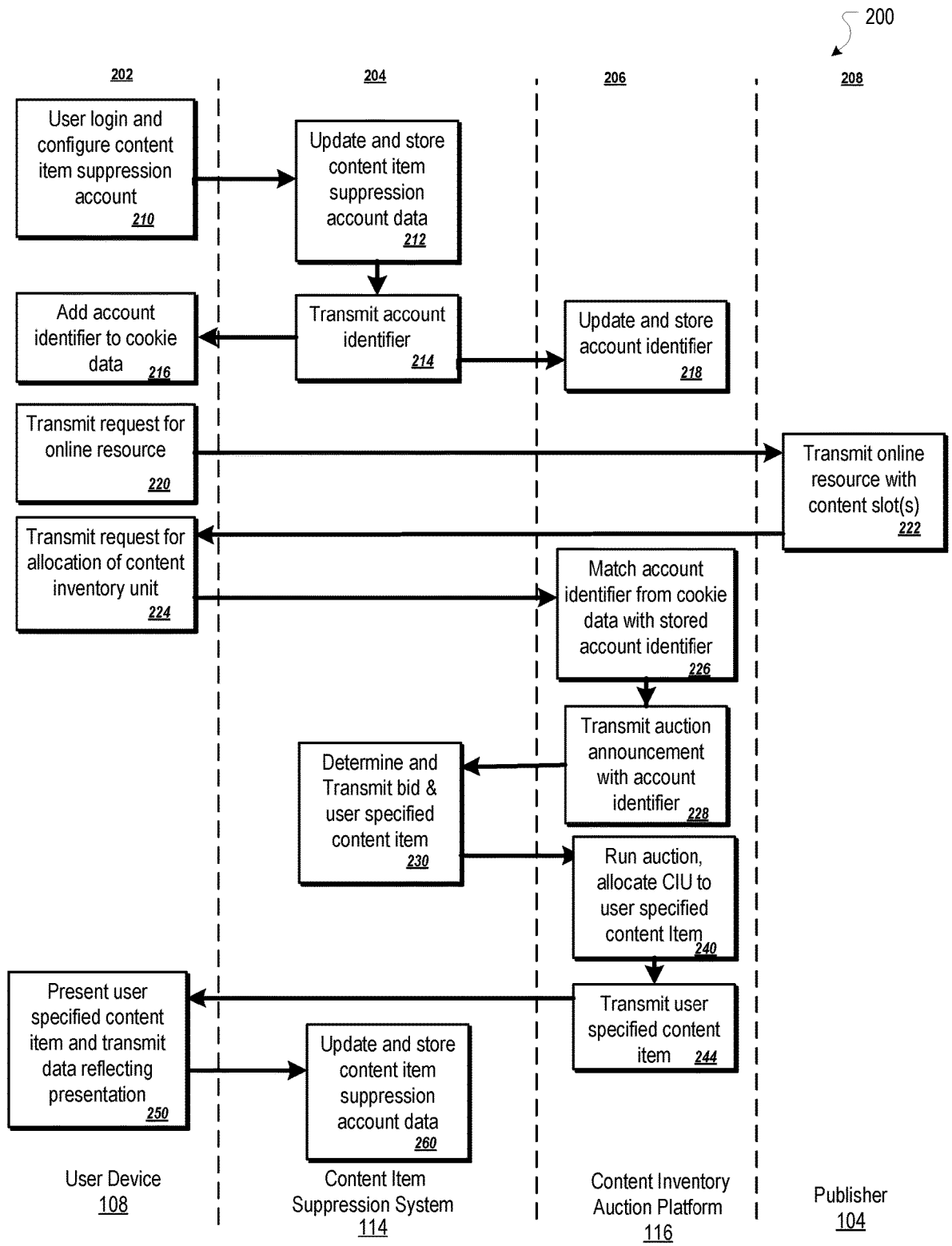
FIG. 2 is a flowchart showing an example of a process for enabling a user to suppress third party content items in online resources presented to the user.

FIG. 2 is a flowchart showing an example of a process 200 for enabling a user to suppress third party content items in online resources presented to the user. In FIG. 2, process 200 is split into parts 202, 204, 206, 208. Part 202 may be performed by user device 108. Part 204 may be performed by content item suppression system 114. Part 206 may be performed by content inventory exchange 116. Part 208 may be performed by publisher 104.

In operation, user device 108 transmits 210 user login and account configuration message(s) to the content item suppression system 114. In some implementations, the login messages may include credentials (e.g., a password) for a user. In some implementations, account configuration messages may include a specification of one or more bidding rules. For example, bidding rule(s) may include a fixed cost-per-mille applicable to all content inventory units. In some implementations, the bidding rule(s) may include a list of publishers or online resources on which bids are either allowed or disallowed. For example, a user may limit bids to favored websites that the user wishes to support to facilitate giving to these favored publishers proportionate to interest and use of their websites. In another example, a user may prevent bids for content inventory items from a list of unscrupulous publishers that load up their resources large numbers of content slots or engage in other behavior that the user disfavors and does not wish to support. The account configuration message(s) may also specify one or more content item items that the user wishes to presented in lieu of third party content items. For example, the user may specify blank or empty content items, a thank you message, or personalized widget (e.g., a user task list or calendar). The account configuration message(s) may also include a payment initiation message to add value or credit to the content item suppression account for the user.

In response to the user login and configuration message(s), the content item suppression system 114 may update and store 212 the account data for the user. In some implementations, the bidding rule(s) and content item(s) specified by the user are stored in a record associated with the account. The content item suppression system 114 may process a payment based on a payment initiation message from the user device to update and store 212 an account credit value. Processing a payment may include communications with a third party system (e.g., credit card payment processing server or another online payment server).

The account is also associated with an account identifier that may be generated by the content item suppression system 114. For example, account identifier may be a numeric code that is unique within the set of user accounts managed by the content item suppression system 114. The account identifier is transmitted 214 to the user device 108 where the account identifier may be stored 216 as cookie data that may be transmitted by the user device with future requests for online resources. The account identifier may also be transmitted 214 from the content item suppression system 114 to one or more auction platforms, including content inventory exchange 116. The content inventory exchange 116 may store 218 the account identifier to update its configuration so that it will recognize in the future when a content inventory unit that it is allocating will be presented to the user associated with the account and can alert the content item suppression system through an auction announcement message.

Sometime after updating the user's content item suppression account data and acquiring the account identifier, the user device 108 transmits 220 a request for an online resource to a publisher 104. The request for the online resource may include cookie data with the account identifier. In response, the publisher 104 transmits to the user device 108 the requested online resource that includes one or more content slots. In the depicted example, the online resource transmitted by the publisher 104 includes executable code that causes the user device to transmit 224 a request for allocation of a content inventory unit in one of the content slots of the resource to the content inventory exchange 116. The request for allocation of the content inventory unit may include the account identifier as cookie data associated with the content inventory unit.

Upon receiving the request for allocation of the content inventory item, the content inventory exchange 116 may match 226 the account identifier from the cookie data for the content inventory unit to the previously stored account identifier received from the content item suppression system 114. In response, the content inventory exchange 116 may transmit 228 to the content item suppression system 114 and/or other competing sources of content items, e.g., advertisers, an auction announcement message that includes the account identifier.

The content item suppression system 114 may determine 230 and submit a bid for the content inventory unit in response to the auction announcement message. The content item suppression system 114 may use the account identifier to retrieve a record for the user's content item suppression account. The bid may be determined based data from the record, including user specified bidding rule(s). In some implementations, a list of publishers or web sites is checked to determine whether the current content inventory unit is eligible for a bid. A user specified content item may also be identified for presentation in the content inventory unit. In some implementations, the content item may be selected from among multiple user specified content items based in part on the media type and/or dimensions or other parameters of the content slot of the content inventory unit. The bid and the selected user specified content item may be transmitted 230 to the content inventory exchange 116 in response to the auction announcement message.

The content inventory exchange 116 may run 240 an auction with the bid from the content item suppression system 114 and bids for content item providers 110 to allocate the content inventory unit (CIU) and determine the price for the CIU. The auction may also depend in part on a reserve price for the CIU specified by the publisher 104. In some implementations, a second-price auction is run and the CIU is allocated to the content item associated with the highest bid, while the price is determined as the maximum of the second highest received bid and a reserve price for the CIU. Where the bid from the content item suppression system 114 is the highest bid, the CIU may be allocated 240 to the user specified content item. The user specified content item may then be transmitted 244 by the auction platform 116 to the user. The auction platform may also transmit an indication of price determined for the CIU to the content item suppression system 114 either directly (e.g., through the network 102) or indirectly via a message that is sent to the user device 108 and forwarded in a reporting message. For example, the user specified content item transmitted 244 may include or be accompanied by executable code that may cause the user device 108 to report the result of the CIU allocation and the presentation of the user specified content item to the content item suppression system 114.

The user device 108 may then present 250 the user specified content item (e.g., a null or blank content item, a personalized widget, etc.) to the user in the content slot of the CIU through a user interface (e.g., a display) of the user device. The user device 108 may also transmit 250 to the content item suppression system 114 data reflecting the presentation of the user specified content item to the user. In some implementations, the data reflecting the presentation of the user specified content item includes the price paid or to be paid to for the CIU by the content item suppression system 114.

The content item suppression system may then update and store suppression account data based on the received data reflecting the presentation of the user specified content item. The data may be stored in usage log for the account (e.g., in data repository 115). A credit balance for the account may also be updated and stored 260 based on the price paid for the content inventory unit. For example, the price paid for the content inventory unit may be subtracted from the prior credit balance for the user's account. In some implementations, a user may be prompted (e.g., via e-mail or some other messaging system) to add credit to the account when the credit balance drops below a threshold.

Figure 3A:
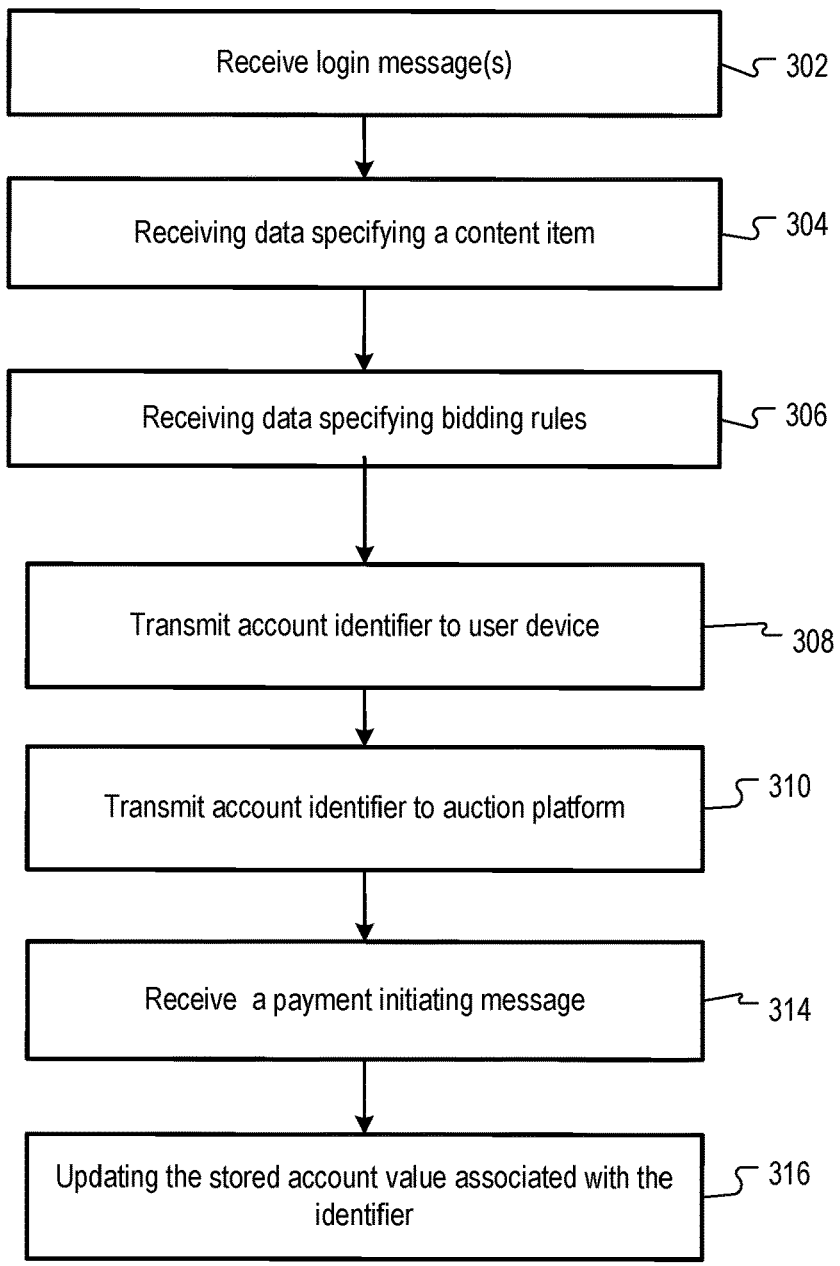
FIG. 3A is a flowchart of an example process for configuring a content item suppression account.

FIG. 3A is a flow chart of an example process 300 for configuring a content item suppression account. The account configuration process 300 may be performed by the configuration module of the content item suppression system 114. Operations commence when a content item suppression system (e.g., system 114) receives 302 one or more login messages from a user device (e.g., user device 108). In some implementations, the login message(s) include a credential (e.g., a password) that is used to control access to a user's content item suppression account data. For example, the login message(s) may be received 302 through a network interface of content item suppression system 114.

Data specifying one or more content items may be received 304. For example, the data specifying the content item(s) may be received from a user device 108. For example, the user may specify a content item that is empty and causes a blank image or video of zero duration to be presented in a content slot in a display of the user device. In some implementations, a user may specify the content item as a personalized widget (e.g., a task list or calendar for the user). In some implementations, multiple content items are specified as applicable to different types of content inventory units. For example, an image may be specified for content inventory units with content slots of media type image, while a video clip may be specified for content inventory units with content slots of media type video. In some implementations, the selection from among multiple specified content items may be specified to depend on other parameters of a content inventory unit, such as the dimensions of a content slot. For example, the data specifying the content item(s) may be received 304 through a network interface of content item suppression system 114.

Data specifying one or more bidding rules may be received 306. For example, the data specifying the bidding rule(s) may be received from a user device 108. In some implementations, the data specifying bids may include a fixed bid (e.g., a fixed cost-per-mille (CPM)) that is used as a fixed bid for all content inventory items presented to the user on the user device 108. In some implementations, the data specifying bids may include a list of publishers (e.g., as specified by their website domain names) that are either blocked or allowed to receive bids for their content inventory units. For example, the data may include a list of websites that are blocked from receiving bids for various reasons, including the use of abusive advertising practices. In another example, the data may include a list of websites or other publishers that are allowed to receive bids because they are publishers that a user wishes to contribute to financially in a way easily tracks the user's patronage of the publisher's online resources. In some implementations, the data specifying bids may include a budget (e.g., $10) for a period of time (e.g., a month) and historical online traffic data for a user device 108. Based on this information the budget may be spent smoothly of the period of time to reduce the volume of third party content items presented on the user device more evenly. For example, the data specifying the bidding rule(s) may be received 306 through a network interface of content item suppression system 114.

An account identifier may be transmitted 308 to the user device. For example, the account identifier may be a code (e.g., an alpha-numeric code) that is generated to be unique among a large set of user accounts maintained by the content item suppression system 114. The account identifier may be stored by the user device 108 as data that is transmitted as part of requests for online resources (e.g., as cookie data). The account identifier may serve as a tag that allows the content item suppression system to use content inventory allocation infrastructure to identify content inventory items associated with requests for resources from the user device 108. For example, the account identifier may be transmitted 308 to a user device through a network interface of content item suppression system 114.

The account identifier may be transmitted 310 to a content inventory exchange (e.g., platform 116). The account identifier may be stored by the content inventory exchange 116 as data that may be compared to incoming requests for allocation of content inventory units to identify content inventory units that the content item suppression system 114 may want to bid for. In some implementations, the content inventory exchange 116 may be configured to transmit an auction announcement message to the content item suppression system when a request for allocation of a content inventory unit is received that includes the account identifier in its descriptive data (e.g., cookie data) for the content inventory unit. For example, the account identifier may be transmitted 310 to an auction platform through a network interface of content item suppression system 114.

A payment initiating message may be received 314 from the user device 108. In some implementations, the payment initiating message causes a credit balance stored for the content item suppression account to be updated 316 with more credit. For example, the payment initiating message may include credit card information for a user. The credit card information may be passed to a credit card provider server to process a payment. The payment initiating message may include other information for facilitating other types of online payment methods, such as bank account information, or other online payment account information. Other types of payment information may be similarly forwarded to an appropriate server for payment processing. Upon successful completion of payment processing, the content item suppression account credit balance may be updated and stored 316 (e.g., the new balance may be stored in data repository 115). For example, the payment initiating message may be received 314 through a network interface of content item suppression system 114 and the account credit balance may be updated and stored 316 by user interface module of content item suppression system 114.

Figure 3B:
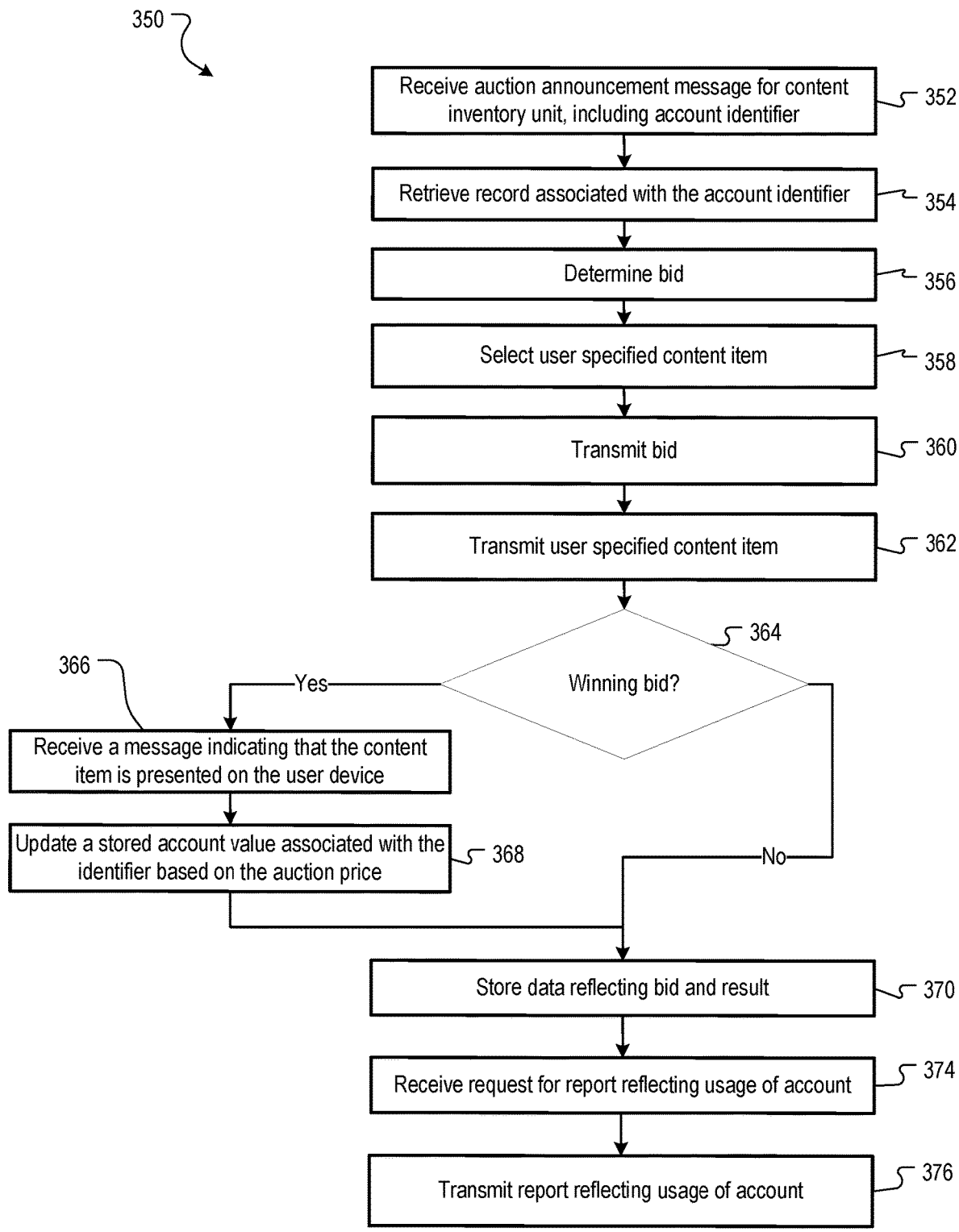
FIG. 3B is a flowchart of an example process for suppressing third party content items.

FIG. 3B is a flow chart of an example process 350 for suppressing third party content items. The content item suppression process 350 may be performed by the bidding module 130 of the content item suppression system 114. For example, process 350 may be performed after a content item suppression account has been configured using process 300. In some implementations, the content item suppression process 350 may be performed by multiple systems, e.g., some operations may be performed by one or more bidding servers, and front-end operations may be performed by one or more other servers. Operations commence when a content item suppression system (e.g., system 114) receives 352 an auction announcement message for a content inventory unit (CIU), including an account identifier for one of the user accounts managed by the content item suppression system. In some implementations, the auction announcement message is received from a content inventory exchange (e.g., platform 116). For example, the auction announcement message may be received 352 through a network interface of content item suppression system 114.

The account identifier may be used to retrieve 354 a record for the account associated with the identifier. For example, an account record may be accessed in a data structure that is indexed by account identifiers and stored in data repository 115. The account record may include data that has been configured by a user (e.g., using process 300). For example, the account may include one or more bidding rules and one or more user specified content items to be presented in lieu of third party content items. In some implementations, the account record includes a credit balance for the account. For example, the record associated with the account identifier may be retrieved 354 by the bidding module 130 of content item suppression system 114.

A bid is determined 356 for the CIU described by the auction announcement message. The bid may be based in part on data from the record for the account including one or more bidding rules. In some implementations, the bid may be determined as a fixed bid (e.g., a fixed cost-per-mille (CPM)). In some implementations, a list of publishers (e.g., as specified by their website domain names) to determine whether a particular publisher associated with the currently auctioned CIU is eligible to receive bids from the user's account. For example, a bid may be determined to be zero or omitted altogether if comparison of the publisher information for the CIU to a list reveals that the publisher 104 is ineligible to receive bids from the account associated with the account identifier. In some implementations, the bid may be determined based on biddings rule(s) that include a budget (e.g., $10) for a period of time (e.g., a month) and historical online traffic data for a user device 108. For example, the bid may be determined as the budget for the time period divided by an expected number of CIUs to be presented on the user device in the remainder of the time period. The bid may also be based on an estimate on the cumulative distribution function of bids for the CIU (e.g., based on a histogram of past bids for CIUs sold through the auction platform, by a publisher 104 that is selling the current CIU, or for past CIUs in the same content slot as the current CIU). For example, the bid may be determined as an inverse cumulative distribution function of the budget divided by an expected number of remaining CIUs for the user device in the time period and an estimate of the average auction price of the CIUs (e.g., an estimate of the average auction price may be derived from a histogram of bids for all CIUs allocated through an auction platform). For example, the bid may be determined 356 by bidding module 130 of content item suppression system 114.

A user specified content item associated with the account may be selected 358 for presentation in lieu of third party content items. In some implementations, the content item may be selected 358 from among multiple content items specified by data in the record for the account. The selection may depend on parameters of a content inventory unit, such as type of the user device (e.g., mobile device vs. desktop with large screen) on which the CIU will be presented, media type (e.g., still image or video) of the content slot, or the dimensions of a content slot, among others. For example, a content item may be selected that is empty and causes a blank image or video of zero duration to be presented in a content slot in a display of the user device. In some implementations, a user may specify the content item as a personalized widget (e.g., a task list or calendar for the user) that is generated dynamically based on user data available on the mobile device using executable code embedded in the selected content item. For example, the content item may be selected 358 by bidding module 130 of content item suppression system 114.

The bid may be transmitted 360 to the content inventory exchange 116 in response to the auction announcement message. For example, the bid may be transmitted 360 through a network interface of content item suppression system 114. The selected user specified content item is also transmitted 362 in response to the auction announcement message. In some implementations, the content item is transmitted 362 with the bid to the content inventory exchange 116. The content inventory exchange 116 may then relay the content item to the user device 108 if the bid is the winning bid in the auction. In some implementations (not shown in FIG. 3B), the content item may be transmitted directly to the user device 108 after confirmation that the bid was won the auction and the CIU was allocated to the content item. For example, the content item may be transmitted 362 through a network interface of content item suppression system 114.

If the bid is the winning bid in the auction 364, then the user specified content item will be presented in the CIU on the user device 108. A confirmation message may be received 366 that indicates that the user specified content item has or will be presented in the CIU on the user device 108. In some implementations, a confirmation message is transmitted by the content inventory exchange 116 immediately after the auction is run and the CIU is allocated to the user specified content item. In some implementations, a confirmation message is transmitted by the user device 108 after the user specified content item has been presented on the user device 108 and/or interacted with by the user. A confirmation message may also include data reflecting the auction price that has been determined by the auction platform 116 and has been or will be paid by the content item suppression system 114 in exchange for the CIU. For example, a confirmation message may be received 366 through a network interface of content item suppression system 114.

A stored account value associated with the account identifier may be updated and stored 368 based on an auction price determined for the CIU that has or will be paid by the content item suppression system 114 on behalf of the user. For example, in the case of a second-price auction, the auction price may have been determined by the auction platform 116 as the maximum of the second highest received bid for the CIU and a reserve price specified by the publisher 104. The auction price may be subtracted from the previously stored credit balance for the content item suppression account associated with the account identifier. For example, the updated value of the credit balance may be stored 368 in the data repository 115. For example, the value of the credit balance may be updated 368 by the bidding module 130 of content item suppression system 114.

The bid and other data describing the result of the bid may be stored 370 for later reference. The stored data may indicate, for example, the bid, whether the bid won the auction, the auction price, which user specified content item was presented to the user, the publisher of the CIU, and an address (e.g., a URL) for the online resource requested by the user device 108, among other things. For example, this data may be stored in data repository 115.

If the bid is not the winning bid in the auction 364, then the user specified content inventory unit is not allocated to a buyer. A content item 112 from a content item provider may be presented in the CIU on the user device 108 instead. In this case, the content item suppression system 114 may pay nothing on behalf of the user. This result may be reflected in data stored 370 by the bidding module 130 (e.g., in data repository 115).

A request may be received 374 for a report reflecting the usage of the content item suppression account associated with the account identifier. In some implementations, a request for report reflecting usage of the account is required to include a credential (e.g., a password) for the account. A request for a report is not necessarily received after each bid is placed in response to an auction announcement message including the account identifier. In some implementations, the requests for a report are transmitted by a user device 108 upon initiation by a user. In some implementations, the requests for a report are received periodically. For example, a request for a report reflecting usage of the account may be received 374 through a network interface of content item suppression system 114.

A usage report may be transmitted 376 that reflects allocations of content inventory units to user specified content item(s) and corresponding changes in the stored account value associated with the account identifier. For example a report may include a list of bids and resulting allocations of CIUs to user specified content item, along with a time history of the credit balance for the content item suppression account associated with the account identifier. In some implementations, a report reflecting usage of the account is generated and transmitted periodically (e.g., in periodic e-mails to a user) by a user interface module in content item suppression system 114. For example, a report reflecting usage of the account may be transmitted 376 through a network interface of content item suppression system 114.

The process 350 may be repeated each time an auction announcement message is received including a content item suppression account identifier. For example, the process 350 may be repeated in response to a second auction announcement message for a second content inventory unit from the auction platform. Where this second auction announcement includes the same account identifier and the second content inventory is being sold by a different publisher than the first content inventory unit, it is an example of enabling a user to make small payments to multiple publishers in exchange for suppressing third party content items without individually registering with either publisher. This may keep transactions costs low and scalable for this type transaction to suppression third party content items and/or financially support favored online resources.

FIG. 4 is block diagram of an example computer system 400 that can be used to allocate content inventory units. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 460.

The web server, advertisement server, and content inventory unit allocation module can be realized by instructions that upon execution cause one or more processing devices to carry out the processes and functions described above. Such instructions can include, for example, interpreted instructions, such as script instructions, e.g., JavaScript or ECMAScript instructions, or executable code, or other instructions stored in a computer readable medium. The web server and advertisement server can be distributively implemented over a network, such as a server farm, or can be implemented in a single computer device.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

The term "processing system" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any claims or of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method performed by one or more data processing apparatus, the method comprising:
    receiving, by a content suppression system and from a user device, a login request identifying a content item suppression account of a user;
    receiving, by the content suppression system and through the content item suppression account of the user, user-specified content for the content item suppression account;
    transmitting, by the content suppression system and to the user device, a user account identifier that uniquely identifies the content item suppression account relative to other content item suppression accounts;
    storing, by a content inventory exchange and in an index of account identifiers, an instance of the user account identifier in a data structure as an indicator that the content inventory exchange is to alert the content suppression system when a received announcement message includes the user account identifier;
    receiving, by the content inventory exchange, an announcement message generated by a publisher resource, where the announcement message includes the user account identifier and a request for the content inventory exchange to provide a content item from a set of available content items provided by third parties relative to the user for presentation in the publisher resource provided by a publisher that differs from the third parties;
    matching, by the content inventory exchange, the user account identifier received in the announcement message to the instance of the user account identifier that was stored by the content inventory exchange in the index of account identifiers;
    in response to the matching, alerting, by the content inventory exchange, the content suppression system of the announcement message and the matching;
    transmitting, by the content suppression system and to the user device for presentation in the publisher resource in response to the announcement message, the user-specified content identified for the content item suppression account rather than third party content from the set of available content items provided by the third parties that would have otherwise been provided in response to the announcement message, wherein the user-specified content is transmitted based on the matching of the user account identifier received in the announcement message to the instance of the user account identifier that was stored in the index of account identifiers, and wherein the transmitting is performed without requiring a registration of the user with the publisher of the publisher resource.

2. The method of claim 1, wherein the user-specified content is received before receiving the announcement message.

3. The method of claim 2, in which the user-specified content is empty and causes a blank image or video of zero duration to be presented in a content slot in a display of the user device.

4. The method of claim 1, further comprising:
    determining, by the content suppression system and in response to receiving the announcement message, a bid for presenting the user-specified content in place of third-party content during a specified period of time based on a budget for the specified period of time and a history of content usage associated with the content item suppression account identifier; and
    transmitting, by the content suppression system, the bid to an auction platform.

5. The method of claim 4, further comprising:
    before receiving the announcement message, receiving, from the user device, data specifying the bid.

6. The method of claim 5, in which the data specifying the bid includes a list of publishers.

7. The method of claim 5, in which the data specifying the bid corresponds to a fixed bid.

8. The method of claim 5, in which the data specifying the bid includes a budget for a period of time and historical online traffic data for the user device.

9. The method of claim 1, further comprising:
reducing, by the content suppression system, a credit balance value of the content item suppression account based on a minimum amount required for presentation of the third party content in response to the announcement message.

10. The method of claim 9, wherein reducing, by the content suppression system, the credit balance value in response to the announcement message comprises reducing the credit balance value by an amount depending on the announcement message.

11. The method of claim 9, further comprising:
transmitting a usage report to the user device reflecting allocations of content inventory units to the user-specified content and corresponding changes in the credit balance value.

12. The method of claim 1, further comprising:
transmitting a request to receive announcement messages for content inventory units associated with data comprising the user account identifier.

13. The method of claim 12, in which the data comprising the user account identifier is for a cookie.

14. The method of claim 1, in which transmitting the user-specified content comprises transmitting the content item to an auction platform.

15. The method of claim 1, in which transmitting the user-specified content comprises transmitting the content item to the user device.

16. The method of claim 1, further comprising:
before receiving the announcement message, transmitting the user account identifier to the user device.

17. The method of claim 1, further comprising:
receiving, by the content suppression system and from the user, a set of rules specifying a list of publisher resources on which the user-specified content is eligible for presentation, wherein transmitting the user-specified content in response to the announcement message is conditioned on the announcement message being generated by one of the publisher resources included in the list of publisher resources.

18. The method of claim 1, further comprising receiving, by the content suppression system, a price for presenting the user-specified content in place of the third-party content that would otherwise have been provided in response to the announcement message.

19. One or more non-transitory machine-readable storage devices storing instructions that are executable by one or more processing devices to perform operations comprising:
receiving, from a user device, a login request identifying a content item suppression account of a user;
receiving, through the content item suppression account of the user, user-specified content for the content item suppression account;
transmitting, to the user device, a user account identifier that uniquely identifies the content item suppression account relative to other content item suppression accounts;
storing, by a content inventory exchange and in an index of account identifiers, an instance of the user account identifier in a data structure as an indicator that the content inventory exchange is to alert the content suppression system when a received announcement message includes the user account identifier;
receiving, by the content inventory exchange, an announcement message generated by a publisher resource, where the announcement message includes the user account identifier and a request for the content inventory exchange to provide a content item from a set of available content items provided by third parties relative to the user for presentation in the publisher resource provided by a publisher that differs from the third parties;
matching, by the content inventory exchange, the user account identifier received in the announcement message to the instance of the user account identifier that was stored by the content inventory exchange in the index of account identifiers;
in response to the matching, alerting, by the content inventory exchange, the content suppression system of the announcement message and the matching;
transmitting, by the content suppression system and to the user device for presentation in the publisher resource in response to the announcement message, the user-specified content identified for the content item suppression account rather than third party content from the set of available content items provided by the third parties that would have otherwise been provided in response to the announcement message, wherein the user-specified content is transmitted based on the matching of the user account identifier received in the announcement message to the instance of the user account identifier that was stored in the index of account identifiers, and wherein the transmitting is performed without requiring a registration of the user with the publisher of the publisher resource.

20. A system comprising:
non-transitory memory storing instructions that are executable; and
one or more processing devices to execute the instructions to implement a content management system, the content management system for performing operations comprising:
receiving by the content suppression system and from a user device, a login request identifying a content item suppression account of a user;
receiving, by the content suppression system and through the content item suppression account of the user, user-specified content by the user for the content item suppression account;
transmitting, by the content suppression system and to the user device, a user account identifier that uniquely identifies the content item suppression account relative to other content item suppression accounts;
storing, by a content inventory exchange and in an index of account identifiers, an instance of the user account identifier in a data structure as an indicator that the content inventory exchange is to alert the content suppression system when a received announcement message includes the user account identifier;
receiving, by the content inventory exchange, an announcement message generated by a publisher resource, where the announcement message includes the user account identifier and a request for the content inventory exchange to provide a content item from a set of available content items provided by third parties relative to the user for presentation in the publisher resource provided by a publisher that differs from the third parties;
matching, by the content inventory exchange, the user account identifier received in the announcement message to the instance of the user account identifier that was stored by the content inventory exchange in the index of account identifiers;

in response to the matching, alerting, by the content inventory exchange, the content suppression system of the announcement message and the matching;

transmitting, by the content suppression system and to the user device for presentation in the publisher resource in response to the announcement message, the user-specified content identified for the content item suppression account rather than third-party content from the set of available content items provided by the third parties that would have otherwise been provided in response to the announcement message, wherein the user-specified content is transmitted based on the matching of the user account identifier received in the announcement message to the instance of the user account identifier that was stored in the index of account identifiers, and wherein the transmitting is performed without requiring a registration of the user with the publisher of the publisher resource.

\* \* \* \* \*